United States Patent
Hayashi et al.

(10) Patent No.: US 11,770,044 B2
(45) Date of Patent: Sep. 26, 2023

(54) ROTATING ELECTRICAL MACHINE

(71) Applicant: Mitsubishi Electric Corporation, Tokyo (JP)

(72) Inventors: Ryohei Hayashi, Tokyo (JP); Kohei Seike, Tokyo (JP); Mitsuo Sone, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 477 days.

(21) Appl. No.: 16/975,201

(22) PCT Filed: May 7, 2018

(86) PCT No.: PCT/JP2018/017596
§ 371 (c)(1),
(2) Date: Aug. 24, 2020

(87) PCT Pub. No.: WO2019/215776
PCT Pub. Date: Nov. 14, 2019

(65) Prior Publication Data
US 2020/0403476 A1 Dec. 24, 2020

(51) Int. Cl.
*H02K 3/50* (2006.01)
*H02K 5/22* (2006.01)
*H02K 11/33* (2016.01)

(52) U.S. Cl.
CPC .............. *H02K 5/225* (2013.01); *H02K 3/50* (2013.01); *H02K 5/22* (2013.01); *H02K 11/33* (2016.01); *H02K 2203/09* (2013.01)

(58) Field of Classification Search
CPC .......... H02K 5/225; H02K 3/50; H02K 11/33; H02K 2203/09; H02K 3/52; H02K 3/38; H02K 5/22

(Continued)

(56) References Cited

U.S. PATENT DOCUMENTS

2004/0069527 A1* 4/2004 Vanhoutte .............. H02G 5/005
174/149 B
2010/0129238 A1 5/2010 Watanabe et al.
(Continued)

FOREIGN PATENT DOCUMENTS

CN 103947088 A 7/2014
CN 205565047 U 9/2016
(Continued)

OTHER PUBLICATIONS

International Search Report for PCT/JP2018/017596, dated Jul. 24, 2018.
(Continued)

*Primary Examiner* — Alexander A Singh
(74) *Attorney, Agent, or Firm* — Sughrue Mion, PLLC; Richard C. Turner

(57) ABSTRACT

A rotating electrical machine such that positional deviation caused by a part tolerance can be absorbed in an electrical connection between a power conversion device and a rotating electrical machine main body, and size can be reduced without a structure becoming complex, is obtained. The rotating electrical machine is characterized by including a power terminal unit of the rotating electrical machine main body housed in a housing, the power conversion device fixed to the housing, and a multilayer bus bar connected to the power terminal unit of the rotating electrical machine main body as a power terminal of the power conversion device, wherein the multilayer bus bar has flexibility, and is bent by being connected to the power terminal unit.

8 Claims, 10 Drawing Sheets

(58) Field of Classification Search
USPC .......................................................... 310/71
See application file for complete search history.

(56) References Cited

U.S. PATENT DOCUMENTS

| | | | | |
|---|---|---|---|---|
| 2012/0273252 | A1* | 11/2012 | Benavides | H02G 5/005 29/832 |
| 2012/0300417 | A1* | 11/2012 | Kusukawa | H05K 1/0265 174/126.1 |
| 2014/0319939 | A1 | 10/2014 | Yamada et al. | |
| 2019/0173270 | A1* | 6/2019 | Sayo | H01R 11/12 |

FOREIGN PATENT DOCUMENTS

| | | |
|---|---|---|
| JP | 1-174815 U | 12/1989 |
| JP | 2-36123 U | 3/1990 |
| JP | 2005-093306 A | 4/2005 |
| JP | 2008-302797 A | 12/2008 |
| JP | 2009-95113 A | 4/2009 |
| JP | 2013-176193 A | 9/2013 |
| JP | 2016-96663 A | 5/2016 |
| JP | 2016-195078 A | 11/2016 |
| JP | 6072887 B1 | 2/2017 |

OTHER PUBLICATIONS

Office Action dated Nov. 2, 2022 from the China National Intellectual Property Administration in CN Application No. 201880092862.8.
Communication dated Jan. 18, 2022, issued by the Japanese Patent Office in application No. 2020-517628.
Notice of Reasons for Refusal dated Aug. 24, 2021 by the Japanese Patent Office in Japanese Application No. 2020-517628.
Office Action dated Jan. 31, 2023 from the Japanese Patent Office in JP Application No. 2020-517628.

* cited by examiner

ROTATING ELECTRICAL MACHINE

CROSS REFERENCE TO RELATED APPLICATIONS

This application is a National Stage of International Application No. PCT/JP2018/017596 filed May 7, 2018.

TECHNICAL FIELD

The present application relates to a rotating electrical machine.

BACKGROUND ART

An existing rotating electrical machine is such that when a power conversion device is fixed to a housing in which a rotating electrical machine main body is stored, a part tolerance of a connection portion of a power terminal unit of the rotating electrical machine main body and a power terminal of the power conversion device means that a relative positional deviation occurs in the connection portion.

In order to absorb this kind of relative positional deviation, the rotating electrical machine main body and the power conversion device are connected using a part having flexibility, such as a wire harness (for example, refer to Patent Literature 1). The existing rotating electrical machine disclosed in Patent Literature 1 is such that a wire harness having flexibility is adopted as the power terminal of the power conversion device connected to the rotating electrical machine main body, and attached using a guide.

CITATION LIST

Patent Literature

Patent Literature 1: Japanese Patent No. 6,072,887

SUMMARY OF INVENTION

Technical Problem

According to Patent Literature 1, however, a terminal needs to be connected to either end of the wire harness for electrical connection, as a result of which the number of parts increases, and a structure becomes complex. Also, crimping using a commercially available crimping terminal or the like is needed when connecting the wire harness and the power terminal, because of which there is a problem in that size reduction is difficult.

The present application discloses technology for resolving the heretofore described kind of problem, and has an object of providing a rotating electrical machine such that positional deviation caused by apart tolerance can be absorbed in an electrical connection between a power conversion device and a rotating electrical machine main body, and size can be reduced without a structure becoming complex.

Solution to Problem

A rotating electrical machine disclosed in the present application is characterized by including a power terminal unit of a rotating electrical machine main body housed in a housing, a power conversion device fixed to the housing, and a multilayer bus bar connected to the power terminal unit of the rotating electrical machine main body as a power terminal of the power conversion device, wherein the multilayer bus bar has flexibility, and is bent by being connected to the power terminal unit.

Advantageous Effects of Invention

According to the rotating electrical machine disclosed in the present application, a rotating electrical machine such that positional deviation caused by a part tolerance can be absorbed in an electrical connection between a power conversion device and a rotating electrical machine main body, and size can be reduced without a structure becoming complex, can be obtained.

DESCRIPTION OF EMBODIMENTS

Figure 1:
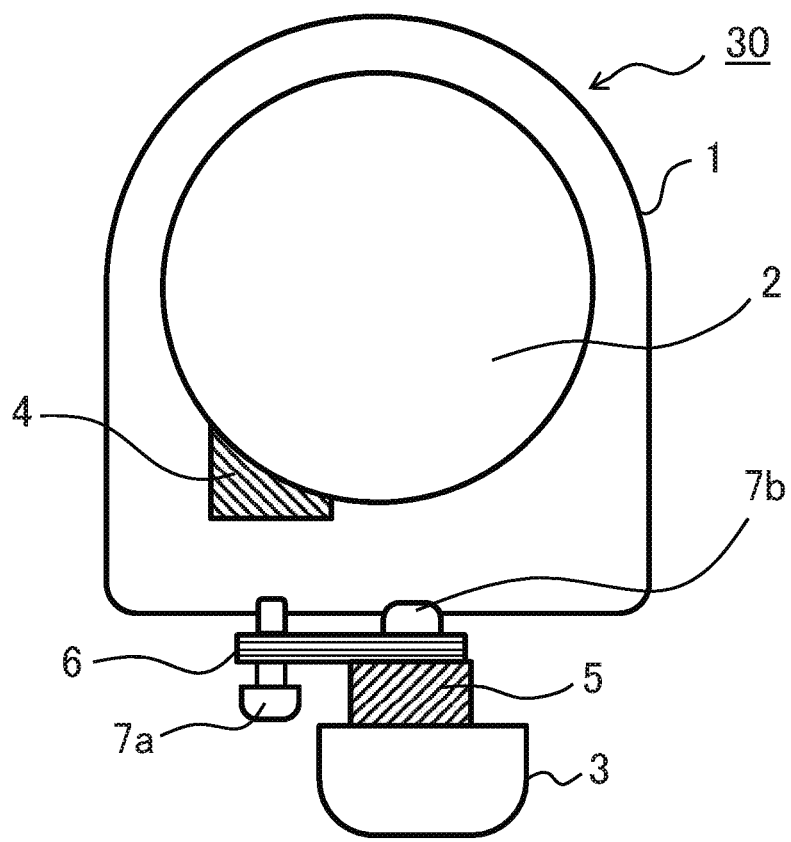
FIG. 1 is a schematic view showing a rotating electrical machine according to a first embodiment.

Hereafter, a rotating electrical machine according to a first embodiment will be described, based on the drawings.
Identical reference signs in the drawings indicate identical or corresponding portions.

First Embodiment

Figure 2:
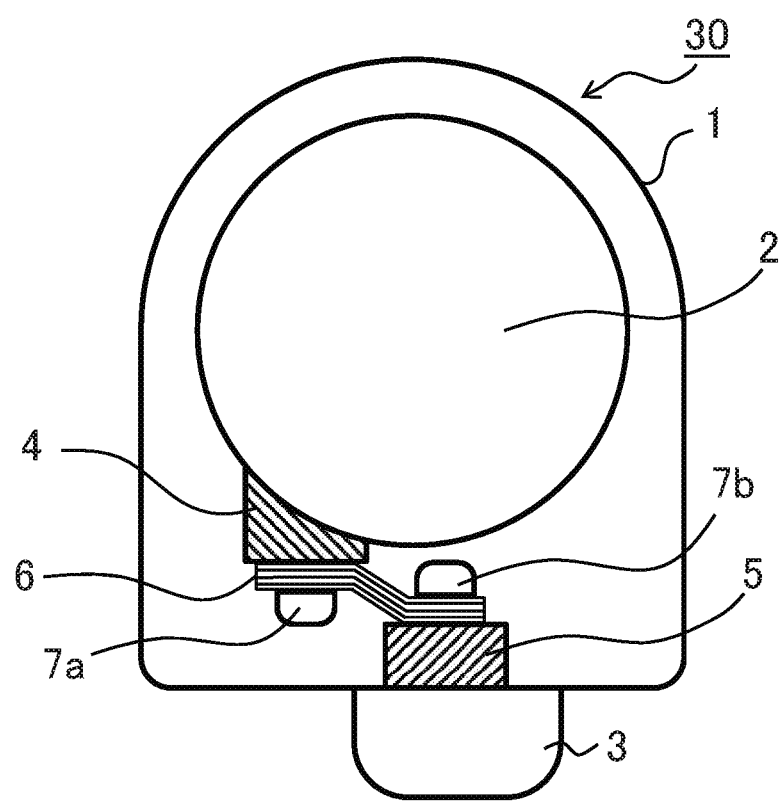
FIG. 2 is a schematic view showing the rotating electrical machine according to the first embodiment.

FIG. 1 and FIG. 2 are schematic views showing a rotating electrical machine according to the first embodiment. FIG. 1 shows a state before an inverter 3 is attached to a housing 1 in which a motor 2 is housed, and FIG. 2 shows a state after the inverter 3 is attached.

As shown in FIG. 1 and FIG. 2, a rotating electrical machine 30 is configured of the housing 1, in which the motor 2 has been housed, and the inverter 3, which has been directly fixed to the housing 1, and a multilayer bus bar 6 is used as a power terminal of the inverter 3. Specifically, a motor terminal block 4 of the motor 2 and an inverter terminal block 5 of the inverter 3 are electrically connected by the multilayer bus bar 6, and fixed with fastening screws 7a and 7b respectively.

Figure 3:
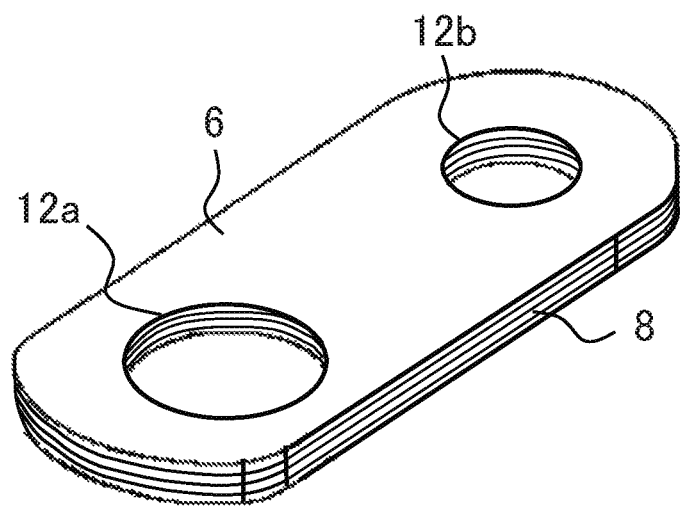
FIG. 3 is a perspective view showing a multilayer bus bar according to the first embodiment.

Also, FIG. 3, which is a perspective view showing a multilayer bus bar according to the first embodiment, is a perspective view of the multilayer bus bar 6 fixed to the inverter terminal block 5 of FIG. 1 and FIG. 2. The multilayer bus bar 6 is configured by six to ten thin plates 8 of a thickness of, for example, 0.3 mm being stacked, and has an overall thickness of, for example, 1.8 mm to 3.0 mm (a sectional area necessary as a power terminal). Also, the multilayer bus bar 6 includes a through hole 12a for fastening by screw to the motor terminal block 4 side and a through hole 12b for fastening by screw to the inverter terminal block 5 side.

An existing rotating electrical machine is such that, due to part tolerance of a housing, a motor, a motor terminal block, and an inverter terminal block, height direction variation occurs in a power terminal screw fastening axial direction in the motor terminal block and the inverter terminal block. Therefore, it is necessary for a power terminal fixed to an inverter and connecting the motor terminal block and the inverter terminal block to absorb the height direction variation by bending.

According to the first embodiment, the multilayer bus bar 6 acting as a power terminal is such that while the sectional area necessary as a power terminal is secured by the thin plates 8 being stacked, the multilayer bus bar 6 has a large flexibility compared with that of a single bus bar, such as a metal plate bus bar, having the same sectional area. As the multilayer bus bar 6 has flexibility, the multilayer bus bar 6 can be caused to bend under a small load when connected to the motor terminal block 4 and the inverter terminal block 5, whereby a load applied to the motor terminal block 4 can be reduced.

Also, although height direction variation absorption is achieved by increasing the flexibility of the multilayer bus bar 6 in the first embodiment, positional variation of the motor terminal block 4 in a planar direction also occurs. In order to absorb this variation, a gap between the screw fastening through hole 12a on the motor terminal block 4 side of the multilayer bus bar 6 and the fastening screw 7a is larger than a gap between the screw fastening through hole 12b on the inverter terminal block 5 side, where fastening is carried out in a state wherein a position is decided, and the fastening screw 7b. Also, in order to fasten the multilayer bus bar 6 having the large gap, a screw bearing surface diameter of the fastening screw 7a on the motor terminal block 4 side is larger than a screw bearing surface diameter of the fastening screw 7b on the inverter terminal block 5 side.

Figure 4:
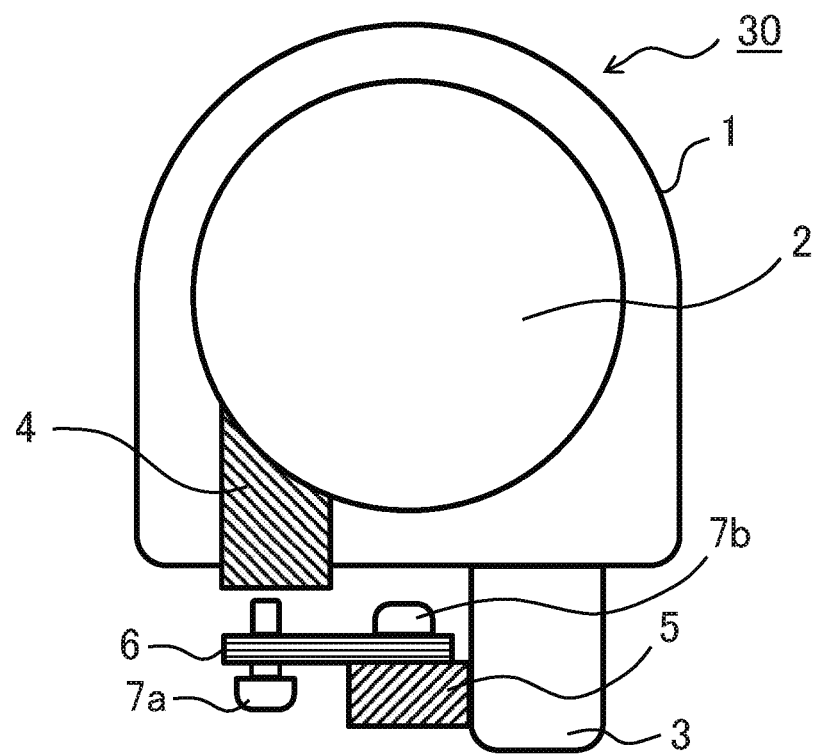
FIG. 4 is a schematic view showing a modification of the rotating electrical machine according to the first embodiment.
Figure 5:
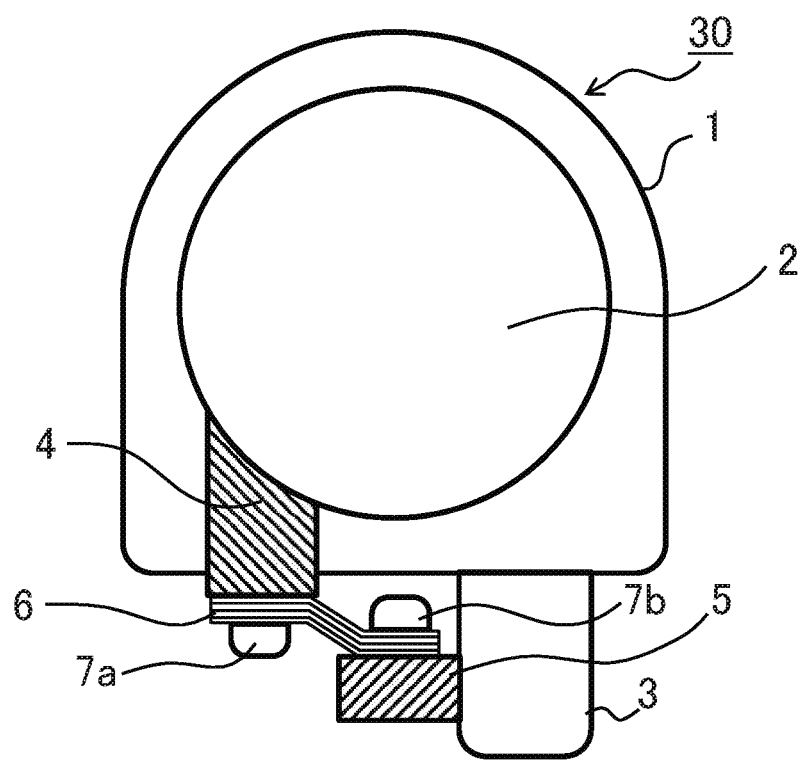
FIG. 5 is a schematic view showing a modification of the rotating electrical machine according to the first embodiment.

FIG. 4 and FIG. 5 are schematic views showing a modification of the rotating electrical machine according to the first embodiment. FIG. 4 shows a state before the inverter 3 is attached to the housing 1 in which the motor 2 is housed, and FIG. 5 shows a state after the inverter 3 is attached.

In FIG. 1, the portion wherein the power terminal is connected to the motor terminal block 4 is installed in an interior of the housing 1, but the portion wherein the power terminal is connected to the motor terminal block 4 may be installed in an exterior of the housing 1, as shown in FIG. 4 and FIG. 5.

The rotating electrical machine 30 of the first embodiment is such that a direction of screw-fastening the multilayer bus bar 6 to the inverter terminal block 5 and a direction of screw-fastening the multilayer bus bar 6 to the motor terminal block 4 are opposite directions, but the two directions can also be the same.

Second Embodiment

Figure 6:
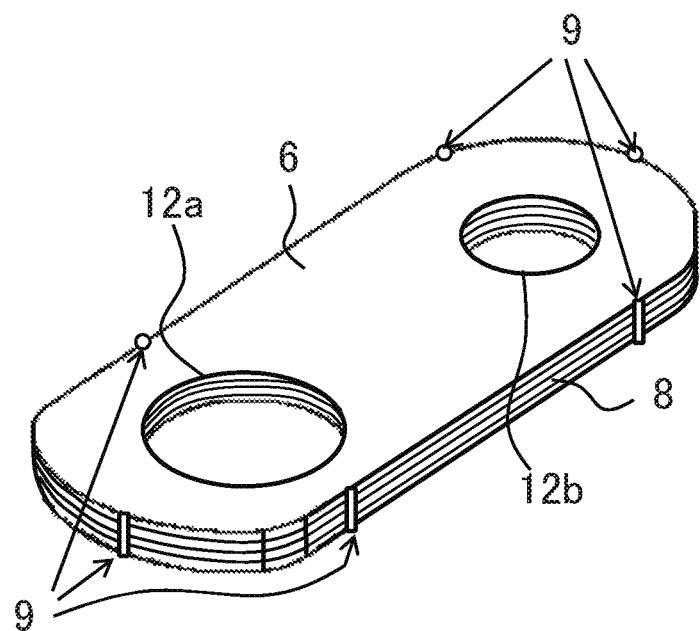
FIG. 6 is a perspective view showing a multilayer bus bar according to a second embodiment.
Figure 7:
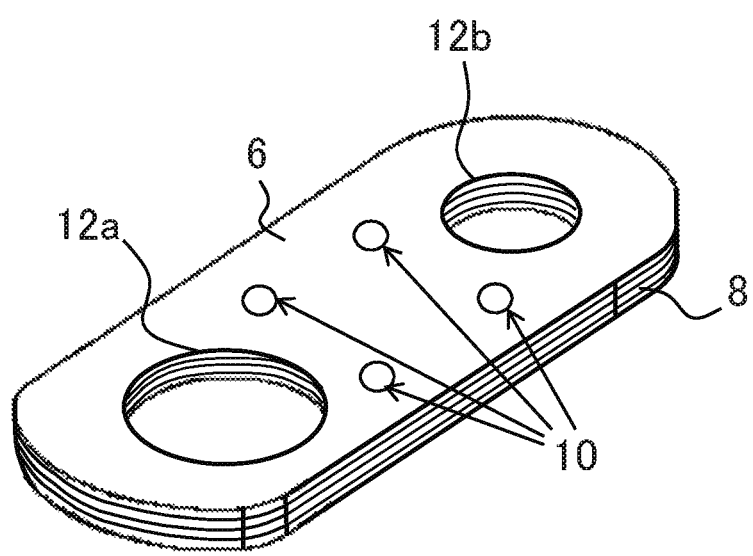
FIG. 7 is a perspective view showing the multilayer bus bar according to the second embodiment.

FIG. 6 and FIG. 7 are perspective views showing a multilayer bus bar according to a second embodiment. Also, FIG. 8 and FIG. 9 are schematic views showing the rotating electrical machine 30 wherein the motor terminal block 4 and the inverter terminal block 5 are connected using the multilayer bus bar 6 shown in FIG. 6 or FIG. 7.

As shown in FIG. 6, the multilayer bus bar 6 is of a structure wherein the multiple of thin plates 8 are integrated by welding. The multilayer bus bar 6 is such that welding is implemented at both an end on the side of the portion connected to the motor terminal block 4 and an end on the side of the portion connected to the inverter terminal block 5, and the multilayer bus bar 6 includes a welded portion 9.

Also, as shown in FIG. 7, the multilayer bus bar 6 is of a structure wherein the multiple of thin plates 8 are integrated by crimping. The multilayer bus bar 6, for example, includes a multiple of crimped portions 10 between the through hole 12a and the through hole 12b.

Figure 8:
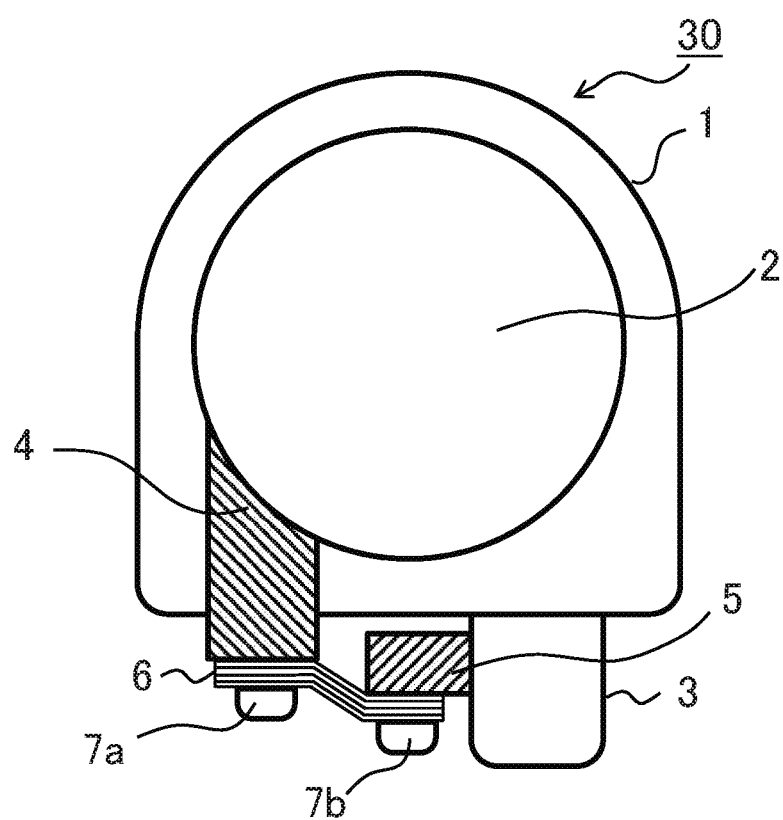
FIG. 8 is a schematic view showing a rotating electrical machine according to the second embodiment.
Figure 9:
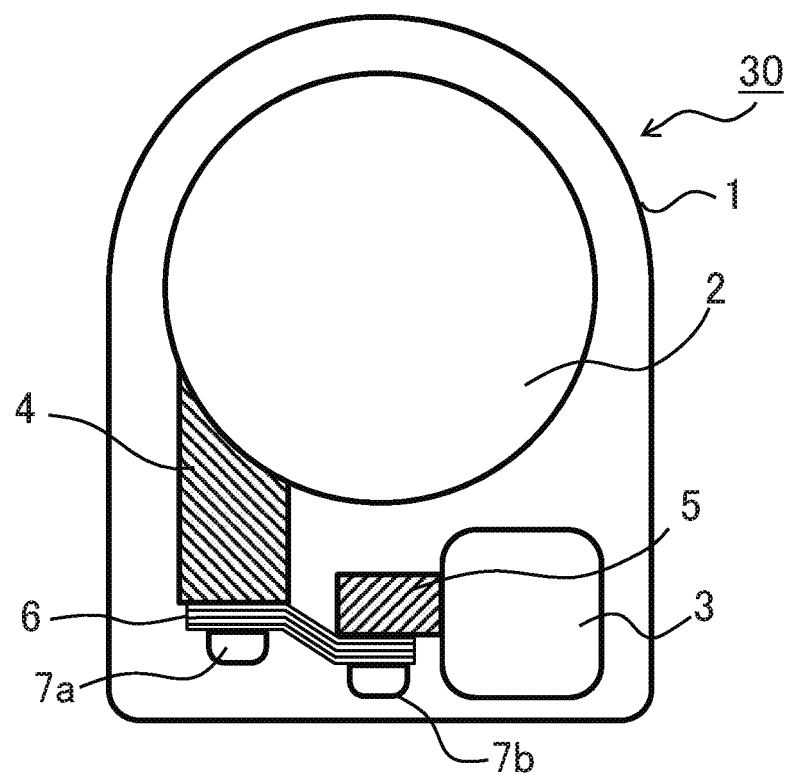
FIG. 9 is a schematic view showing the rotating electrical machine according to the second embodiment.

In the second embodiment, in the same way as in the first embodiment, the multilayer bus bar 6 is attached to the inverter terminal block 5, as shown in FIG. 8 and FIG. 9. By the multiple of thin plates 8 being integrated by welding or crimping in the multilayer bus bar 6, attachability of the multilayer bus bar 6 to the motor terminal block 4 or the inverter terminal block 5 can be improved.

In the second embodiment, welding is implemented on the multilayer bus bar 6 at both the end on the side of the portion connected to the motor terminal block 4 and the end on the side of the portion connected to the inverter terminal block 5, but flexibility when connecting to the motor terminal block 4 can be increased by welding only the end on the side of the portion connected to the inverter terminal block 5. A case wherein connection with the motor terminal block 4 and the inverter terminal block 5 is carried out in the exterior of the housing 1 is shown in FIG. 8, and a case wherein connection is carried out in the interior of the housing 1 is shown in FIG. 9.

In FIG. 8 and FIG. 9, the direction of screw-fastening the multilayer bus bar 6 to the inverter terminal block 5 and the direction of screw-fastening the multilayer bus bar 6 to the motor terminal block 4 are the same.

Third Embodiment

Figure 10:
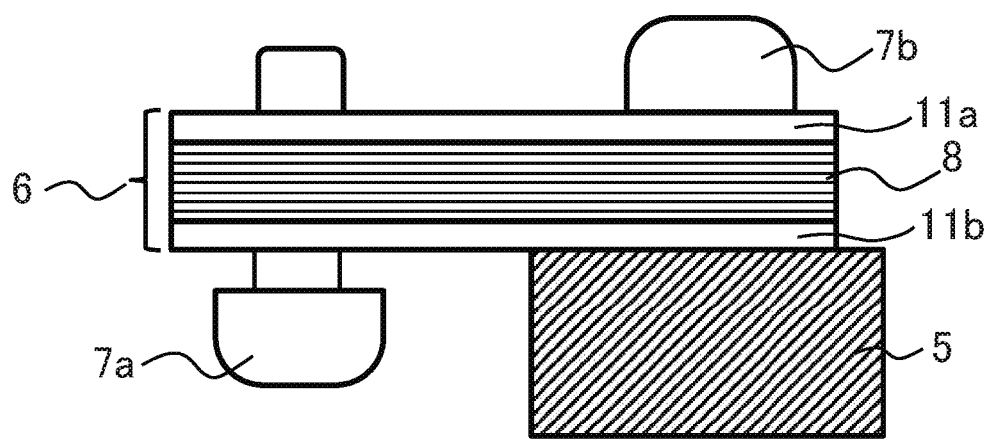
FIG. 10 is a side view showing a multilayer bus bar according to a third embodiment.
Figure 11:
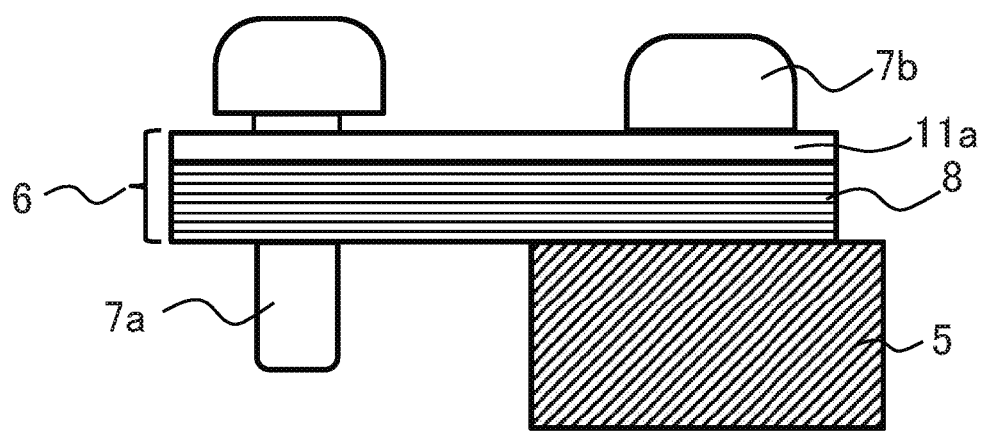
FIG. 11 is a side view showing the multilayer bus bar according to the third embodiment.

FIG. 10 and FIG. 11 are enlarged side views of a multilayer bus bar according to a third embodiment. The multilayer bus bar 6 of FIG. 10 and FIG. 11 is attached to the inverter terminal block 5, in the same way as in the first embodiment.

FIG. 10 is a side view including the inverter terminal block 5, wherein the thicknesses of an uppermost layer 11a and a lowermost layer 11b of the multilayer bus bar 6 are configured to be greater than the thicknesses of the other thin plates 8. When reducing the thicknesses of the stacked thin plates 8 in order to increase flexibility, it may happen that the plate of the uppermost layer 11a deforms due to screw fastening when attached to the inverter terminal block 5. Also, it may happen that the plate of the lowermost layer 11b deforms due to screw fastening when attached to the motor terminal block 4. According to the multilayer bus bar 6 according to the third embodiment, resistance to deformation caused by screw fastening when attaching can be increased by the uppermost layer 11a and the lowermost layer 11b being thicker than the other thin plates 8.

By the screw-fastening direction of the multilayer bus bar 6 on the inverter terminal block 5 side and the screw-fastening direction on the motor terminal block 4 side being the same, as shown in FIG. 11, no deformation occurs in the plate of the lowermost layer 11b, because of which, by only the uppermost layer 11a being thicker than the other thin plates 8, resistance to deformation caused by screw fastening when attaching can be increased by the uppermost layer 11a alone.

According to the first embodiment to the third embodiment, a description has been given of the rotating electrical machine 30 including a power conversion device, which is the inverter 3, directly electrically connected to a rotating electrical machine main body, which is the motor 2, but this is not limiting provided that the power conversion device is a device that converts power, and in the same way, the rotating electrical machine main body is not limited to being the motor 2.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments.

It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

REFERENCE SIGNS LIST

1 housing, 2 motor, 3 inverter, 4 motor terminal block, 5 inverter terminal block, 6 multilayer bus bar, 7a fastening screw, 7b fastening screw, 8 thin plate, 9 welded portion, 10 crimped portion, 11a uppermost layer, 11b lowermost layer, 12a through hole, 12b through hole, 30 rotating electrical machine

The invention claimed is:

1. A rotating electrical machine, comprising:
   a power terminal unit of a rotating electrical machine main body housed in a housing;
   a power conversion device fixed to the housing; and
   a multilayer bus bar connected to the power terminal unit of the rotating electrical machine main body and a terminal unit of the power conversion device, wherein
   the multilayer bus bar has flexibility, and is bent by being connected to the power terminal unit,
   the multilayer bus bar includes a first through hole for screw-fastening to the power terminal unit and a second through hole for screw-fastening to the terminal unit of the power conversion device, and
   a first gap between the first through hole and a first screw inserted into the first through hole is larger than a second gap between the second through hole and a second screw inserted into the second through hole.

2. The rotating electrical machine according to claim 1, wherein the multilayer bus bar is a structure wherein a multiple of thin plates are stacked, and an other end portion on a side opposite to that of a one end portion fastened to the power terminal unit is integrated by welding.

3. The rotating electrical machine according to claim 2, wherein the one end portion of the multilayer bus bar fastened to the power terminal unit is integrated by welding.

4. The rotating electrical machine according to claim 3, wherein a thickness of an uppermost layer or a lowermost layer of the multiple of thin plates is greater than thicknesses of the other thin plates configuring the multilayer bus bar.

5. The rotating electrical machine according to claim 2, wherein a thickness of an uppermost layer or a lowermost layer of the multiple of thin plates is greater than thicknesses of the other thin plates configuring the multilayer bus bar.

6. The rotating electrical machine according to claim 1, wherein the multilayer bus bar is a structure wherein a multiple of thin plates are stacked, and is integrated by crimping.

7. The rotating electrical machine according to claim 6, wherein a thickness of an uppermost layer or a lowermost layer of the multiple of thin plates is greater than thicknesses of the other thin plates configuring the multilayer bus bar.

8. The rotating electrical machine according to claim 1, wherein a bearing surface diameter of the first screw is larger than a bearing surface diameter of the second screw.

* * * * *